(12) United States Patent
Liu et al.

(10) Patent No.: US 12,401,273 B2
(45) Date of Patent: Aug. 26, 2025

(54) RESONANT CONVERTER, AND CONTROLLING METHOD FOR THE SAME

(71) Applicant: Delta Electronics (Shanghai) Co., Ltd., Shanghai (CN)

(72) Inventors: Hong Liu, Shanghai (CN); Baihui Song, Shanghai (CN); Sanyuan Ouyang, Shanghai (CN); Cheng Lu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 264 days.

(21) Appl. No.: 18/347,591

(22) Filed: Jul. 6, 2023

(65) Prior Publication Data
US 2024/0022167 A1   Jan. 18, 2024

(30) Foreign Application Priority Data
Jul. 15, 2022   (CN) .................. 202210836748.X

(51) Int. Cl.
*H02M 3/335* (2006.01)
*H02M 1/00* (2006.01)
*H02M 3/00* (2006.01)

(52) U.S. Cl.
CPC ........... *H02M 3/01* (2021.05); *H02M 1/0058* (2021.05); *H02M 3/33576* (2013.01); *H02M 3/33561* (2013.01)

(58) Field of Classification Search
CPC .. H02M 3/01; H02M 1/0058; H02M 3/33576; H02M 3/33561

(Continued)

(56) References Cited

U.S. PATENT DOCUMENTS

| | | | |
|---|---|---|---|
| 6,201,719 B1 * | 3/2001 | He ............... | H02M 7/5387 363/72 |
| 10,135,350 B2 | 11/2018 | Ye et al. | |

(Continued)

FOREIGN PATENT DOCUMENTS

AU       2013370446 A1 *   5/2015   ............. H02J 3/381

OTHER PUBLICATIONS

Jong-Woo Kim et al. "PWM-Controlled Series Resonant Converter for Universal Electric Vehicle Charger", IEEE Transactions on Power Electronics, vol. 36, No. 12, Dec. 2021.

(Continued)

*Primary Examiner* — Yemane Mehari
(74) *Attorney, Agent, or Firm* — CKC & Partners Co., LLC

(57) ABSTRACT

The present disclosure discloses a resonant converter, and a controlling method thereof. The resonant converter includes a transformer including a primary winding and a secondary winding, a primary circuit electrically connected to the primary winding and receiving an input voltage, and a secondary circuit electrically connected to the secondary winding and outputting an output voltage. The secondary circuit includes a first secondary half-bridge including a first controllable switch and a second secondary half-bridge including a second controllable switch connected in parallel. The first and second controllable switches are arranged diagonally. The method includes: controlling a duty ratio of one of the first controllable switch and the second controllable switch in a first switching period to form a first short-circuited loop during a first interval during; and controlling a duty ratio of the other one in a second switching period to form a second short-circuited loop during a second interval.

20 Claims, 15 Drawing Sheets

(58) Field of Classification Search
USPC ...................................................... 363/21.02
See application file for complete search history.

(56) References Cited

U.S. PATENT DOCUMENTS

| | | |
|---|---|---|
| 10,756,617 B2 | 8/2020 | Wei et al. |
| 2002/0186026 A1* | 12/2002 | Elferich ............ H02M 3/33561 |
| | | 324/652 |
| 2015/0229225 A1 | 8/2015 | Jang et al. |
| 2015/0333634 A1 | 11/2015 | Yoshida et al. |
| 2022/0103015 A1 | 3/2022 | Nussbaum et al. |

OTHER PUBLICATIONS

Lu Cheng et al, "Neutral-Point Voltage Balancing Methods of Series-Half-Bridge LLC Converter for Solid State Transformer," IEEE Transactions on Power Electronics, Institute of Electrical and Electronics Engineers, USA, vol. 36, No. 6, Nov. 2, 2020 (Nov. 2, 2020), pp. 7060-7073.

* cited by examiner

① $1 \leq \text{Gain} \leq 2$, $D_{S5} = 0.5$

② $\text{Gain} > 2$, $D_{S8} = 1$

300

Modulating a first controllable switch and a second
controllable switch respectively, to form a short-circuited loop
in the secondary circuit, such that a voltage between a neutral-
point of the first secondary half-bridge and a neutral point of
the second secondary half-bridge is to be zero

RESONANT CONVERTER, AND CONTROLLING METHOD FOR THE SAME

CROSS REFERENCE TO RELATED APPLICATION

This application claims the benefit of priority to Chinese Application No. 202210836748.X, filed on Jul. 15, 2022, the content of which is incorporated herein by reference in its entirety.

BACKGROUND OF THE DISCLOSURE

1. Field of the Disclosure

The present disclosure relates to a power conversion technology, and in particular, to a resonant converter, and a controlling method for the same.

2. Related Art

An isolated resonant converter may be applied to a solid state transformer (SST). The solid state transformer (SST) is widely applicable in DC-power generation or consumption fields, such as a data center, an electric vehicle charging and changing station, photovoltaic technology and energy storage technology. The SST may include a pre-stage AC-DC converter and a post-stage DC-DC converter. For each phase, inputs are cascaded, and outputs are connected in parallel.

For the applications in the data center and the electric vehicle charging and changing station, high reliability, high efficiency and capability of outputting a wide range voltage are required for the SST. For example, when the SST is applied to the data center, the voltage required ranges from 200V to 900V. And when the SST is applied to the electric vehicle charging and changing station, the voltage required ranges from 200V to 1000V. Outputting wide range voltage relies on the controlling to the post-stage converter of the SST. The post-stage converter can be the resonant converter including a transformer. A primary winding of the transformer is coupled to a primary circuit which receives an input voltage, and a secondary winding of the transformer is coupled to a secondary circuit which outputs an output voltage. However, the resonant converter is hardly to realize a wide-range boosting by merely modulating a frequency. Therefore, a wide-range and efficient control for the resonant converter is of great significance for improving the reliability and efficiency of the SST.

In a prior art (I), a secondary-side phase-shifting control is proposed for boosting voltage. Specifically, a phase-shifting angle φ between a secondary-side switch and a primary-side switch is controlled to form a short circuited loop at the secondary side, thereby implementing the boosting control. However, the phase-shifting angle φ increases when a boosting ratio increases, which causes the turn-off current of a controllable switch at the secondary side increase, thereby increasing the turn-off loss. Especially, in a case of a high gain (e.g., 2 or more), the turn-off loss of the controllable switch at the secondary side is large.

In a prior art (II), a PWM control at the secondary side is proposed for boosting voltage. Specifically, duty ratios of two controllable switches at the secondary side are modulated to boosting the output voltage, and a short-circuited loop is formed at the secondary side. However, one of the two controllable switches at the secondary side has a fixed duty ratio, while the other one has an adjustable duty ratio, such that the two switches work in asymmetric states, resulting in unbalanced losses. As a result, the service life and reliability of the device are influenced.

SUMMARY OF THE DISCLOSURE

An object of the present disclosure is to provide a resonant converter a controlling method thereof, which may effectively solve at least one defect in the prior art and realize a wide-range boosting of an output voltage.

In order to achieve the above-mentioned object, the present disclosure provides a method for controlling a resonant converter. The resonant converter includes a transformer having a primary winding and a secondary winding, a primary circuit electrically connected to the primary winding and receiving an input voltage, and a secondary circuit electrically connected to the secondary winding and outputting an output voltage. The secondary circuit includes a first secondary half-bridge and a second secondary half-bridge connected in parallel, the first secondary half-bridge includes a first controllable switch, the second secondary half-bridge includes a second controllable switch, and the first controllable switch and the second controllable switch are arranged diagonally. The method includes: controlling a duty ratio of a first one of the first controllable switch and the second controllable switch in a first switching period to form a first short-circuited loop during a first interval; and controlling a duty ratio of a second one of the first controllable switch and the second controllable switch in a second switching period to form a second short-circuited loop during a second interval.

In an embodiment of the disclosure, the first switching period and the second switching period may be adjacent switching periods; or the first switching period and the second switching period may be spaced apart from each other with an integer number of switching periods.

In an embodiment of the disclosure, the method may further include: acquiring the output voltage, and obtaining a regulated signal according to the output voltage; during the first switching period, adjusting the duty ratio of the first one of the first controllable switch and the second controllable switch based on the regulated signal, and setting the duty ratio of the second one of the first controllable switch and the second controllable switch to be a fixed value; and during the second switching period, setting the duty ratio of the first one of the first controllable switch and the second controllable switch to be the fixed value, and adjusting the duty ratio of the second one of the first controllable switch and the second controllable switch based on the regulated signal.

In an embodiment of the disclosure, when 1≤Gain≤2 and Gain indicates a voltage gain, the method may further include: during the first switching period, controlling the duty ratio of the first one of the first controllable switch and the second controllable switch to be equal to or greater than 0.5 and less than or equal to 1 based on the output voltage, and modulating the duty ratio of the second one of the first controllable switch and the second controllable switch to be equal to 0.5; and during the second switching period, modulating the duty ratio of the first one of the first controllable switch and the second controllable switch to be equal to 0.5, and controlling the duty ratio of the second one of the first controllable switch and the second controllable switch to be equal to or greater than 0.5 and less than or equal to 1 based on the output voltage.

In an embodiment of the disclosure, when 1≤Gain≤2 and Gain indicates a voltage gain, during the first switching period, the first interval starts at a time of turning off the second one of the first controllable switch and the second controllable switch and ends at a time of turning off the first one of the first controllable switch and the second controllable switch; and during the second switching period, the second interval starts at a time of turn off the first one of the first controllable switch and the second controllable switch, and ends at a time of turning off the second one of the first controllable switch and the second controllable switch.

In an embodiment of the disclosure, when 1≤Gain≤2 and Gain indicates a voltage gain, the first short-circuited loop corresponds to a loop formed by the secondary winding, the first one of the first controllable switch and the second controllable switch, and a switch located in the same bridge with the second one of the first controllable switch and the second controllable switch; and the second short-circuited loop corresponds to a loop formed by the secondary winding, the second one of the first controllable switch and the second controllable switch, and a switch located in the same bridge with the first one of the first controllable switch and the second controllable switch.

In an embodiment of the disclosure, when Gain>2 and Gain indicates a voltage gain, the method may further include: during the first switching period, controlling the duty ratio of the first one of the first controllable switch and the second controllable switch to be greater than 0.5 and less than 1 based on the output voltage, and modulating the duty ratio of the second one of the first controllable switch and the second controllable switch to be equal to 1; and during the second switching period, modulating the duty ratio of the first one of the first controllable switch and the second controllable switch to be equal to 1, and controlling the duty ratio of the second one of the first controllable switch and the second controllable switch to be greater than 0.5 and less than 1 based on the output voltage.

In an embodiment of the disclosure, when Gain>2, the secondary current is continuous, and Gain indicates a voltage gain, during the first switching period, the first interval starts at a time of turning off the first one of the first controllable switch and the second controllable switch and ends at a time of turning off the second one of the first controllable switch and the second controllable switch; and during the second switching period, the second interval starts at a time of turning off the second one of the first controllable switch and the second controllable switch, and ends at a time of turning off the first one of the first controllable switch and the second controllable switch.

In an embodiment of the disclosure, when Gain>2, the secondary current is discontinuous, and Gain indicates the voltage gain, during the first switching period, the first interval starts at a time of turning off the first one of the first controllable switch and the second controllable switch, and ends at a time when a secondary current is decreased to zero; and during the second switching period, the second interval starts at a time of turning off the second one of the first controllable switch and the second controllable switch, and ends at a time when the secondary current is decreased to zero.

In an embodiment of the disclosure, when Gain>2 and Gain indicates the voltage gain, the first short-circuited loop corresponds to a loop formed by the secondary winding, the second one of the first controllable switch and the second controllable switch, and a switch located in the same bridge with the first one of the first controllable switch and the second controllable switch; and the second short-circuited loop corresponds to a loop formed by the secondary winding, the first one of the first controllable switch and the second controllable switch, and a switch located in the same bridge with the second one of the first controllable switch and the second controllable switch.

In an embodiment of the disclosure, the method may further include: comparing the output voltage with a reference value to obtain an error signal; regulating the error signal to obtain a first intermediate signal; superimposing a constant value on the first intermediate signal to obtain a second intermediate signal; and limiting the second intermediate signal to obtain the regulated signal.

In an embodiment of the disclosure, the method may further include: when an open-circuited fault occurs in a switch of a first bridge in the primary circuit, constantly conducting the other switch of the first bridge, and complementarily conducting two switches of a second bridge.

In order to achieve the above-mentioned object, the present disclosure further provides a resonant converter, including a transformer having a primary winding and a secondary winding; a primary circuit electrically connected to the primary winding and receiving an input voltage; a secondary circuit electrically connected to the secondary winding and outputting an output voltage, and a controller. The secondary circuit includes a first secondary half-bridge and a second secondary half-bridge connected in parallel, the first secondary half-bridge includes a first controllable switch, a second secondary half-bridge includes a second controllable switch, and the first controllable switch and the second controllable switch are arranged diagonally. The controller configured to: control a duty ratio of a first one of the first controllable switch and the second controllable switch in a first switching period to form a first short-circuited loop during a first interval during; and control the duty ratio of a second one of the first controllable switch and the second controllable switch in a second switching period to form a second short-circuited loop during a second interval.

In another embodiment of the disclosure, the controller may be configured to: acquire the output voltage, and obtain a regulated signal according to the output voltage; during the first switching period, adjust the duty ratio of the first one of the first controllable switch and the second controllable switch based on the regulated signal, and set the duty ratio of the second one of the first controllable switch and the second controllable switch to be a fixed value; and during the second switching period, set the duty ratio of the first one of the first controllable switch and the second controllable switch to be the fixed value, and adjust the duty ratio of the second one of the first controllable switch and the second controllable switch based on the regulated signal.

In another embodiment of the disclosure, the controller may include: a subtractor configured to compare the output voltage with a reference value to obtain an error signal; a regulator configured to regulate the error signal to obtain a first intermediate signal; an adder configured to superimpose a constant value on the first intermediate signal to obtain a second intermediate signal; and a limiter configured to limit the second intermediate signal to obtain the regulated signal.

In another embodiment of the disclosure, the controller is further configured to: when an open-circuited fault occurs in a switch of a first bridge in the primary circuit, constantly conduct the other switch of the first bridge, and complementarily conduct two switches of a second bridge.

In another embodiment of the disclosure, the secondary circuit may further include: a blocking capacitor electrically connected in series with the secondary winding and then electrically connected to a neutral point of the first secondary half-bridge and a neutral point of the second secondary half-bridge.

In another embodiment of the disclosure, the first controllable switch may be an upper switch of the first secondary half-bridge and the second controllable switch is a lower switch of the second secondary half-bridge; or the first controllable switch may be a lower switch of the first secondary half-bridge and the second controllable switch is an upper switch of the second secondary half-bridge.

In another embodiment of the disclosure, the first secondary half-bridge may further include a diode electrically connected in series with the first controllable switch; and the second secondary half-bridge may further include a diode electrically connected in series with the second controllable switch.

In order to achieve the above-mentioned object, the present disclosure still further provides a method for modulating a resonant converter. The resonant converter includes a transformer having a primary winding and a secondary winding; a primary circuit electrically connected to the primary winding and receiving an input voltage; and a secondary circuit electrically connected to the secondary winding and outputting an output voltage. The secondary circuit includes a first secondary half-bridge and a second secondary half-bridge connected in parallel, the first secondary half-bridge includes a first controllable switch, the second secondary half-bridge includes a second controllable switch, and the first controllable switch and the second controllable switch are arranged diagonally. The method may include: modulating the first controllable switch and the second controllable switch respectively to form a short-circuited loop in the secondary circuit, such that a voltage between a neutral point of the first secondary half-bridge and a neutral point of the second secondary half-bridge is to be zero.

BRIEF DESCRIPTION OF THE DRAWINGS

These and additional features and advantages of the present disclosure will be more apparent in view of the following detailed description of the exemplary embodiments with reference to the drawings, in which:

FIG. 14 is a schematic diagram illustrating a method for modulating a resonant converter according to the present disclosure.

DETAILED EMBODIMENTS OF THE DISCLOSURE

Figure 1:
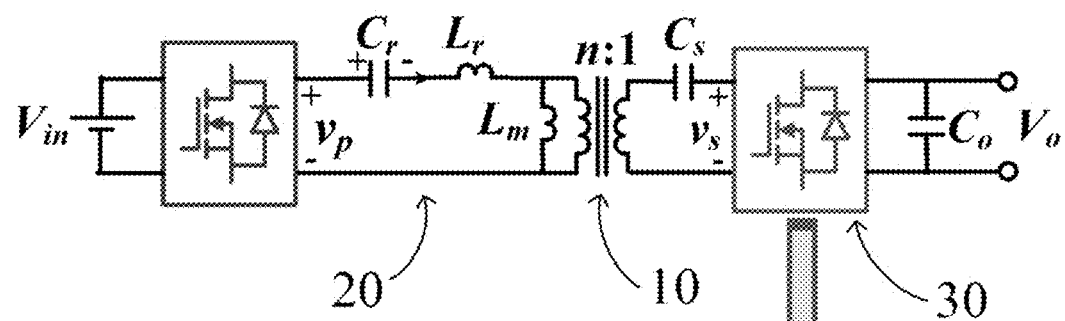
FIG. 1 is a schematic diagram illustrating a circuit topology of a resonant converter according to the present disclosure.
Figure 1:
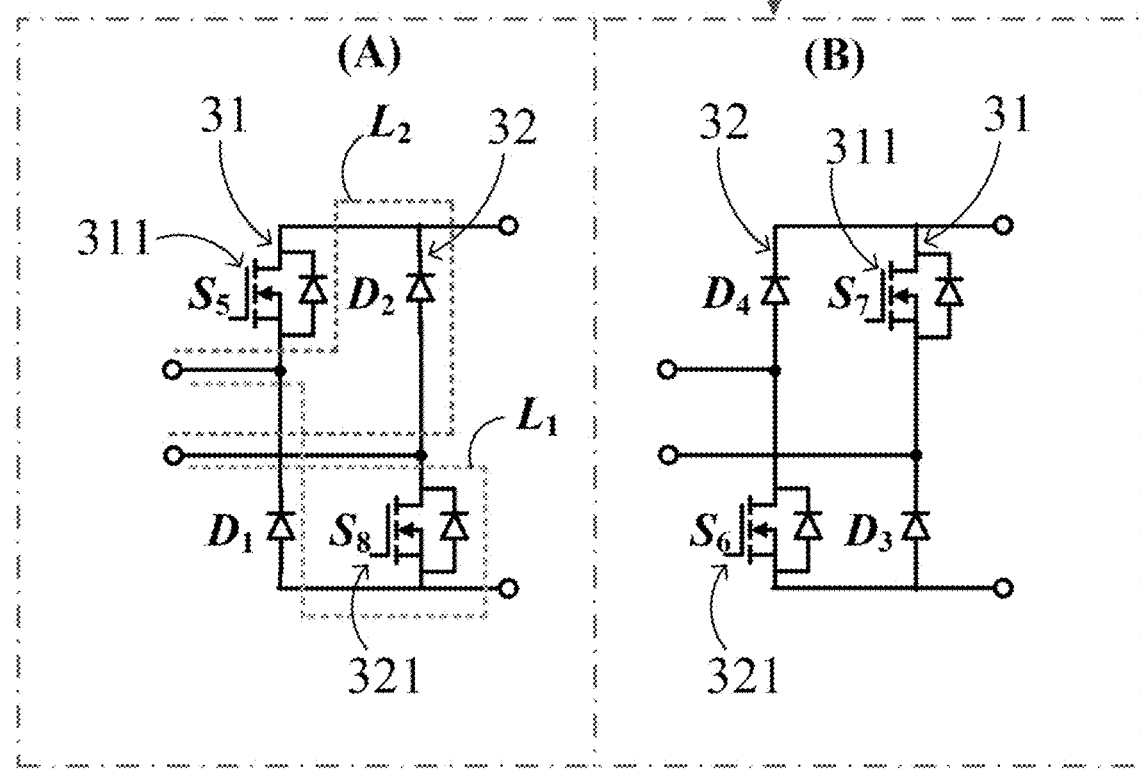

Exemplary embodiments will now be described more fully with reference to the accompanying drawing. However, the exemplary embodiments may be implemented in many forms and should not be construed as limited to the embodiments set forth herein. On the contrary, these exemplary embodiments are provided so that this disclosure will be comprehensive and complete, and the conception of exemplary embodiments will be fully conveyed to those skilled in the art. In the drawings, the same reference numerals indicate the same or similar structures, and thus repeated descriptions thereof will be omitted.

For any element/component/the like described and/or depicted herein, the terms "a", "an", "the", "said" and "at least one" are used to indicate the presence of one or more elements/components/the like. The terms "comprise", "include" and "have" are used to mean non-exclusive inclusion and mean that element/component/the like other than that expressly listed may be included or comprised. In addition, the terms such as "first" and "second" and the like in the claims are used solely as signs rather than numerical limitations imposed on their objects.

When a numeric range or a numerical relation between two parts is described using the terms such as "equal to", it is not interpreted to refer to an absolute/exact range or relation, but interpreted to include an ordinary error range even if not expressly stated.

FIG. 1 shows a circuit topology of a resonant converter 100 according to the present disclosure. Referring to FIG. 1, the resonant converter 100 may be used for outputting a wide-range boosted voltage. The resonant converter 100 includes a transformer 10. A primary winding of the transformer 10 is electrically connected to a primary circuit 20 which receives an input voltage V. A secondary winding of the transformer 10 is electrically connected to a secondary circuit 30 which outputs an output voltage $V_o$. In the embodiment, the resonant converter 100 is an LLC resonant converter. The resonant converter 100 includes a resonant capacitor $C_r$, a resonance inductor $L_r$, an excitation inductor $L_m$, a blocking capacitor $C_s$, and an output capacitor $C_o$. In the resonant converter 100, a transformation ratio of the transformer 10 is n:1; a primary leg voltage is $v_p$; and a secondary leg voltage is $v_s$. The blocking capacitor $C_s$ is electrically connected in series with the secondary winding and then electrically connected to a neutral point of a first secondary half-bridge 31 and a second secondary half-bridge 32. Of course, it is understood that in other embodiments, the resonant converter 100 may be other types of converters, which are not construed as limitations to the present disclosure.

According to the present disclosure, the secondary circuit 30 includes a first secondary half-bridge 31 and a second secondary half-bridge 32 connected in parallel. The first secondary half-bridge includes an upper switch and a lower switch connected in series. And the neutral points of the two secondary half-bridges 31, 32 are electrically connected to two terminals of the secondary winding, respectively. Here, the upper switch in the first secondary half-bridge 31 corresponds to a first controllable switch 311, and the lower switch in the second secondary half-bridge 32 corresponds to a second controllable switch 321. With respect to the embodiment shown in FIG. 1, the secondary circuit 30 may have a circuit structure as shown in part (A) or part (B), in which the controllable switches 311, 321 in the two secondary half-bridges 31, 32 are arranged at diagonal positions. As shown in part (A), the upper switch $S_5$ in the first secondary half-bridge 31 (i.e., the first controllable switch) and the lower switch $S_8$ in the second secondary half-bridge 32 (i.e., the second controllable switch) are arranged at diagonal positions of the circuit, and the other two switches may be diodes $D_1$, $D_2$, or synchronous rectifier switches. As shown in part (B), the upper switch $S_7$ in the first secondary half-bridge 31 (i.e., the first controllable switch) and the lower switch $S_6$ in the second secondary half-bridge 32 (i.e., the second controllable switch) are arranged at diagonal positions of the circuit, and the other two devices may be diodes $D_3$, $D_4$ or synchronous rectifier switches.

Figure 2:
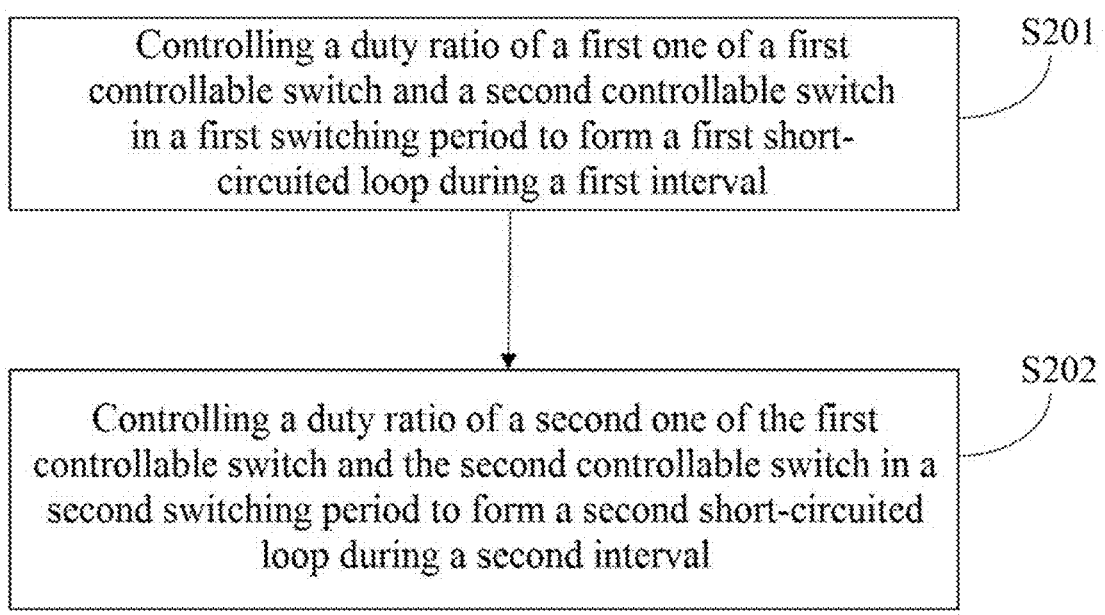
FIG. 2 is a flow chart illustrating a method for controlling a resonant converter according to the present disclosure.

As shown in FIG. 2, in the present disclosure, a method 200 for controlling a resonant converter includes the following steps.

In step S201, control a duty ratio of a first one of the first controllable switch and the second controllable switch in a first switching period to form a first short-circuited loop during a first interval.

In step S202, control a duty ratio of a second one of the first controllable switch and the second controllable switch in a second switching period to form a second short-circuited loop during a second interval.

A secondary current flows through the first short-circuited loop during the first interval. The secondary current flows through the second short-circuited loop during the second interval. The first switching period and the second switching period may be adjacent switching periods. In other embodiments, the first switching period and the second switching period may be spaced apart from each other with an integer number of switching periods.

Figure 3:
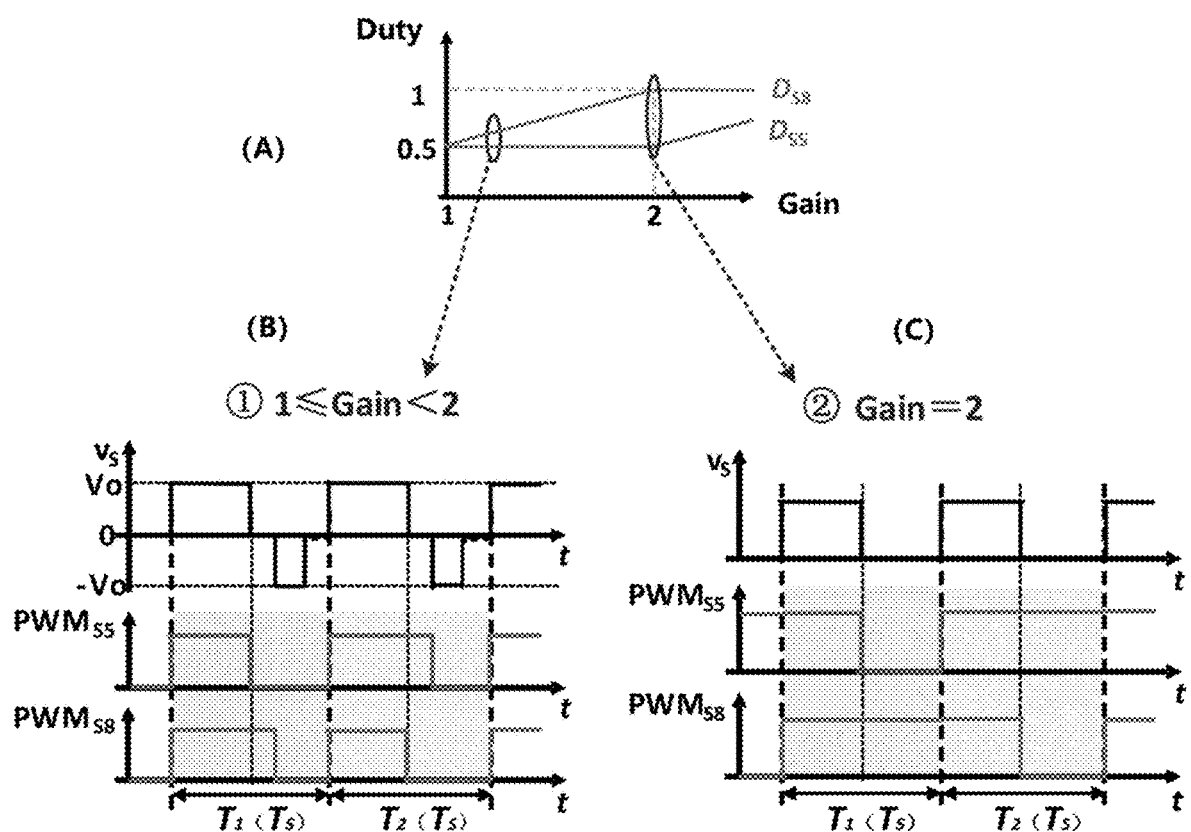
FIG. 3 is waveforms of an alternate half-bridge controlling method for the resonant converter according to the present disclosure.

FIG. 3 shows waveforms of an alternate half-bridge controlling method for the resonant converter according to the present disclosure. As shown in FIG. 3, the secondary circuit of the resonant converter is described by taking the circuit structure shown in part (A) of FIG. 1 as an example, in which the switches $S_5$ and $S_8$ are used as the controllable switches. Here, Gain indicates a voltage gain and is calculated with a formula, such as Gain=$nV_o/V_{in}$ where n indicates the transformation ratio of the transformer, $V_o$ indicates the output voltage, and $V_{in}$ indicates the input voltage. When a series half bridge (SHB) circuit is used, the input voltage refers to a voltage across a capacitor. $T_s$ indicates the switching period. PWM$_{S5}$ and PWM$_{S8}$ indicate driving signals for the switches $S_5$ and $S_8$, respectively. $D_{S5}$ and $D_{S8}$ indicate duty ratios of the switches $S_5$ and $S_8$ in one switching period, respectively. Please continuously referring to FIG. 1 and FIG. 3, the secondary circuit 30 operates at a resonant frequency, and duty ratios of the two controllable switches ($S_5$ and $S_8$) in the secondary circuit 30 are controlled. One controllable switch has a fixed duty ratio and the other has an adjustable duty ratio to satisfy requirements for the output voltage. In addition, the duty ratios of the two controllable switches are alternately modulated to allow two short-circuited loops at the secondary circuit to operate alternately.

As an example, FIG. 3 illustrates two alternate switching periods $T_1$ and $T_2$. When 1≤Gain≤2, during the first switching period $T_1$, $D_{S5}$=0.5, and 0.5≤$D_{S8}$<1. The switch $S_8$ is modulated according to the output voltage $V_o$ in a closed-loop manner to generate a first interval during which the secondary winding is short-circuited, and a secondary current flows through the short-circuited loop in the lower half-bridge. For example, the secondary current is reversed to flow through a first short-circuited loop $L_1$ which is formed by the secondary winding, and the switch $S_8$ and the diode $D_1$ in the secondary circuit in part (A) to implement voltage boosting, as shown in FIG. 1. During the second switching period $T_2$, the duty ratios of the switches $S_5$ and $S_8$ are exchanged, that is, $D_{S8}$=0.5, 0.5≤$D_{S5}$<1. The switch $S_5$ is modulated according to the output voltage $V_o$ in a closed-loop manner to generate a second interval during which the secondary winding is short-circuited, and the secondary current flows through the short-circuited loop in the upper half-bridge. For example, the secondary current is reversed to flow through a second short-circuited loop $L_2$ which is formed by the secondary winding, and the switch $S_5$ and the diode $D_2$ in the secondary circuit in part (A) to implement voltage boosting, as shown in FIG. 1. When Gain=2, during the first switching period $T_1$, $D_{S8}$=1, and $D_{S5}$=0.5, so the switch $S_8$ is kept on. Then, during the second switching period $T_2$, $D_{S5}$=1, and $D_{S8}$=0.5, so the switch $S_5$ is kept on. When Gain=2, the switching frequency of the switches $S_5$ and $S_8$ are equal to half of the switching frequency of the primary switch, in which the secondary circuit operates in an alternate half bridge manner to output a double voltage. When Gain>2, during the first switching period $T_1$, the switch $S_8$ is kept on, and the switch $S_5$ is modulated. Then, during the second switching period $T_2$, the switch $S_5$ is kept on, and the switch $S_8$ is modulated to control the output voltage $V_o$. Therefore, the present disclosure is capable of reducing switching loss at the secondary side while implementing the wide-range voltage boosting. Additionally, in terms of the two switching periods, the two controllable switches (e.g., $S_5$ and $S_8$) have symmetrical operational modals, thereby equalizing the loss and improving the reliability.

Figure 4:
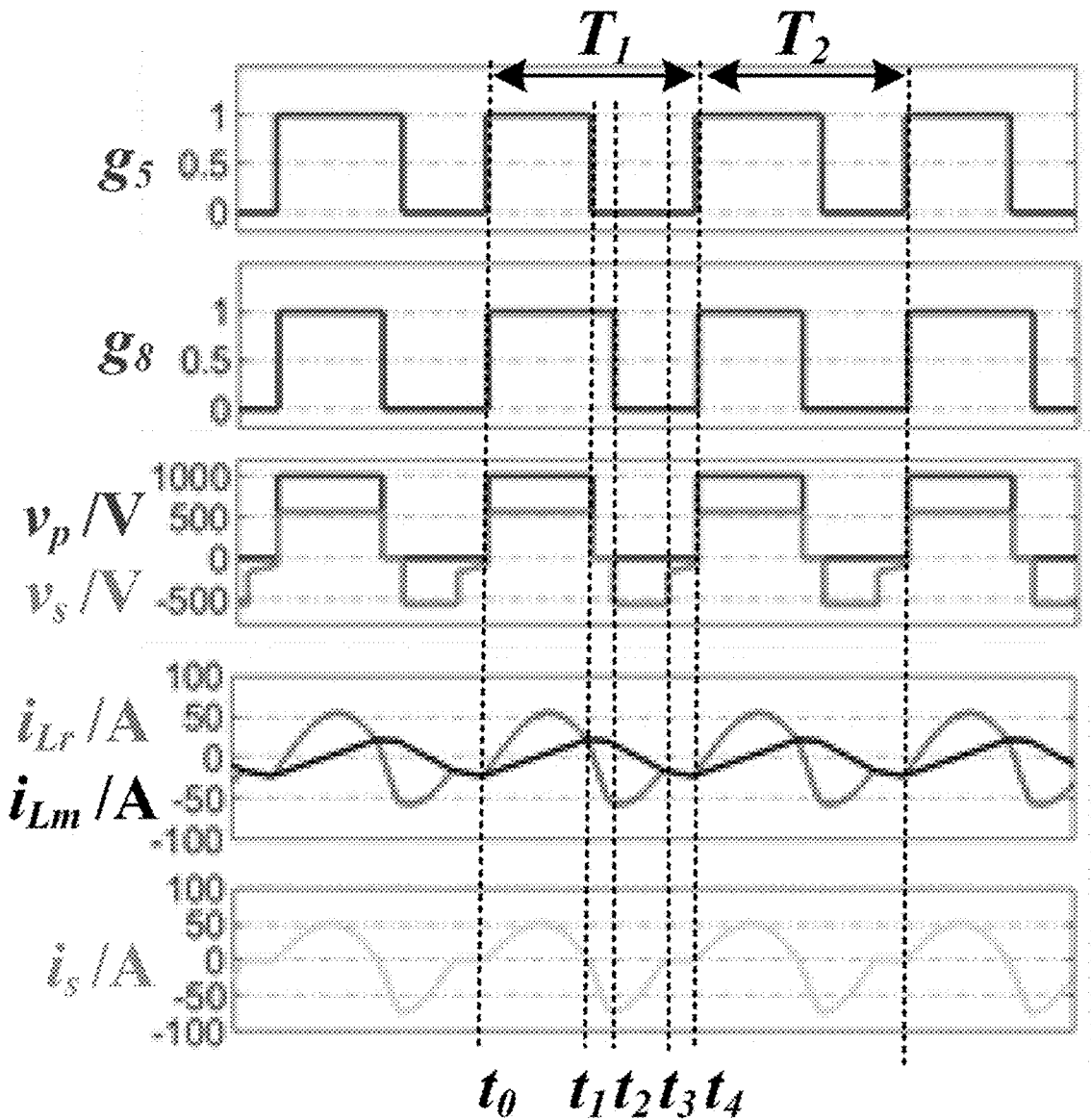
FIG. 4 shows operating waveforms of a resonant converter with 1≤Gain≤2.

FIG. 4 shows operating waveforms of a resonant converter. In the resonant converter, a primary circuit is a SHB circuit, and a secondary circuit is the circuit as shown in part (A) of FIG. 1. Please referring to FIGS. 4, g5 and g8 are switching signals for the switches $S_5$ and $S_8$. In the embodiment, the duty ratios of two controllable switches (e.g., $S_5$ and $S_8$) are exchanged in two continuous switching period. As shown in FIG. 4, 1≤Gain<2, and four switching modes are included during one switching period. Taking the switching period $T_1$ as an example, the interval from $t_0$ to $t_1$ is a positive half period, the switches $S_5$ and $S_8$ are conducted simultaneously, and the primary circuit transmits power to the secondary circuit during the interval $t_0$ to $t_1$. After half of the switching period, a resonance current $i_{Lr}$ is equal to an excitation current $i_{Lm}$ at $t_1$. At the time, the secondary current $i_s$ is equal to 0, and the switch $S_5$ is turned off with zero current switching (ZCS). During the interval from $t_1$ to $t_2$ (i.e., the first interval), the switch $S_8$ is continuously conducted, the secondary current of the transformer increases reversely, the secondary current flows through the first short-circuited loop $L_1$, the secondary winding is short-circuited, the converter operates in a boost state, the resonance inductor stores energy, and the resonance current increases rapidly. At $t_2$, the switch $S_8$ is turned off. During the interval from $t_2$ to $t_3$, the secondary current flows through the diode $D_2$, output terminals and the diode $D_1$, the secondary leg voltage $v_s$ is approximately equal to the output voltage $V_o$, the secondary current decreases reversely, the primary circuit transmits the power to the output terminals, and the resonance current $i_{Lr}$ is gradually decreased until the resonance current $i_{Lr}$ is equal to the excitation current $i_{Lm}$. During the interval from $t_3$ to $t_4$, the secondary current $i_s$ is decreased to 0, the secondary circuit operates in DCM (Discontinuous Conduction Mode), the excitation inductor is involved in the resonance, and the secondary leg voltage $v_s$ is induced from the voltage of the excitation inductor by the secondary winding of the transformer.

Referring to FIG. 4, during the switching period $T_1$ as indicated from $t_0$ to $t_4$, the switch $S_5$ is turned off at the half of the period $T_1$, such that the duty ratio is equal to 0.5. After the half of the switching period $T_1$, the switch $S_8$ is continuously conducted, such that the duty ratio is greater than 0.5 and less than 1. During the next switching period $T_2$, the duty ratios of the switches $S_5$ and $S_8$ are exchanged, and the primary leg voltage $v_p$, the secondary leg voltage $v_s$, the resonance inductor current $i_{Lr}$, the excitation inductor current $i_{Lm}$, and the secondary current $i_s$ are similar as those during the switching period $T_1$. During the switching period $T_2$, after half of the switching period, the resonance current is equal to the excitation current. At the time, the secondary current $i_s$ is decreased to 0, the switch $S_8$ is turned off with the ZCS, and the switch $S_5$ is continuously conducted. At the time, the second interval starts, the secondary current of the transformer increases reversely, the secondary current flows through the second short-circuited loop $L_2$, the secondary winding is short-circuited, and the converter operates in the boost state. During the switching period $T_2$, the switch $S_8$ is turned off at the half of the period $T_2$, such that the duty ratio is equal to 0.5. After half of the switching period, the switch $S_5$ is continuously conducted, such that the duty ratio is greater than 0.5 and less than 1.

When 1≤Gain≤2, there is the first interval (e.g., the period from $t_1$ to $t_2$) or the second interval in a switching period. The first interval (e.g., the period from $t_1$ to $t_2$) or the second interval correspond to a boosting interval of the switching period. When the load is constant, the longer the boosting interval in each of the switching periods is, the larger the obtained voltage gain is. The boosting interval (i.e., the first interval or the second interval) in each of the switching periods is adjusted by controlling the duty ratios of the switches, thereby obtaining the desired voltage gain.

When 1≤Gain≤2, during the first switching period $T_1$, for example, the first interval starts at the time of turning off the switch $S_5$, and ends at the time of turning off the switch $S_8$. That is to say, the first interval is from the time of turning off the switch $S_5$ to the time of turning off the switch $S_8$. During the second switching period $T_2$, for example, the second interval starts at the time of turning off the switch $S_8$, and ends at the time of turning off the switch $S_5$. That is to say, the second interval is from the time of turning off the switch $S_8$ to the time of turning off the switch $S_5$.

Figure 5:
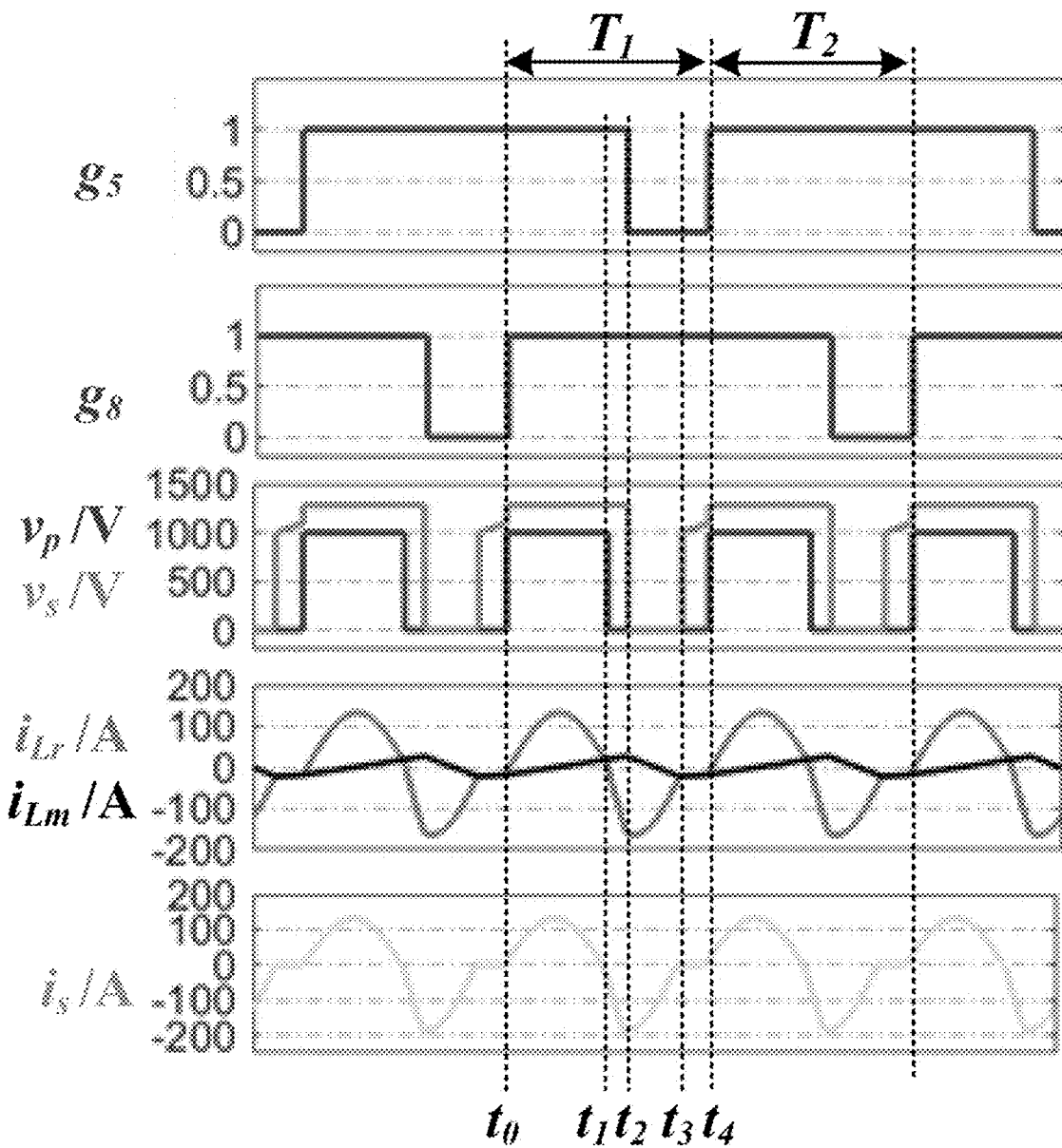
FIG. 5 shows operating waveforms of a resonant converter with Gain>2.

The following description will also be presented by taking a circuit which has a primary topology of SHB and a secondary circuit with a structure as shown in part (A) of FIG. 1 as an example. FIG. 5 shows operating waveforms of a resonant converter. And the resonant converter corresponding to FIG. 5 is the same as that corresponding to FIG. 4. In the embodiment, the duty ratios of two controllable switches (e.g., $S_5$ and $S_8$) are exchanged in two continuous switching period. As shown in FIG. 5, Gain>2, and four switching modes are included during one switching period. Taking the switching period $T_1$ as an example, the interval from $t_0$ to $t_1$ is a positive half period, the switches $S_5$ and $S_8$ are conducted simultaneously, and the primary circuit transmits power to the secondary circuit. After half of the switching period, the resonance current $i_{Lr}$ is equal to the excitation current $i_{Lm}$ at $t_1$. At the time, the secondary current $i_s$ is equal to 0. During the interval from $t_1$ to $t_2$, the switches $S_5$ and $S_8$ are continuously conducted, the secondary current $i_s$ flows reversely through the switch $S_8$, an output capacitor, and the switch $S_5$, and the secondary leg voltage $v_s$ is equal to the output voltage $V_o$. At the time, the output capacitor outputs the power to the load, the resonance inductor stores energy, and the resonance current $i_{Lr}$ increases rapidly in a reverse direction. Thus, the converter operates in the boost state. At $t_2$, the switch $S_5$ is turned off such that the duty ratio of the switch $S_5$ is greater than 0.5 and less than 1, and the switch $S_8$ is continuously conducted. During the interval from $t_2$ to $t_3$ (i.e., the first interval), the secondary current decreases reversely, the secondary current flows through the first short-circuited loop $L_1$, the resonance current $i_{Lr}$ is gradually decreased until the resonance current $i_{Lr}$ is equal to the excitation current $i_{Lm}$. During the interval from $t_3$ to $t_4$, the secondary current $i_s$ is decreased to 0, the secondary circuit operates in DCM, the excitation inductor is involved in the resonance, and the secondary leg voltage $v_s$ is induced from the voltage of the excitation inductor by the secondary winding of the transformer. At $t_4$, the switch $S_8$ is turned off and the switching period $T_1$ ends.

Referring to FIG. 5, during the switching period $T_1$ as indicated from $t_0$ to $t_4$, the duty ratio of the switch $S_5$ is greater than 0.5 and less than 1, and the duty ratio of the switch $S_8$ is equal to 1. It is to be noted that when the secondary circuit operates in DCM, the switch $S_8$ may be turned off at any time after the secondary current is decreased to zero. That is, the switch $S_8$ may be turned off at any time during the interval from $t_3$ to $t_4$. If the switch $S_8$ is turned off before the switching period $T_1$ ends, the turn-on loss can be reduced. To simplify the control for the duty ratio, in the embodiment, the switch $S_8$ is kept conducted during the switching period $T_1$. During the next switching period $T_2$, the duty ratios of the switches $S_5$ and $S_8$ are exchanged, and the primary leg voltage $v_p$, the secondary leg voltage $v_s$, the resonance inductor current $i_{Lr}$, the excitation inductor current $i_{Lm}$, and the secondary current $i_s$ are similar as those during the switching period $T_1$. During the switching period $T_2$, after half of the switching period, the resonance current is equal to the excitation current. At the time, the secondary current $i_s$ is decreased to 0, and the switches $S_5$ and $S_8$ are continuously conducted. Then, the switch $S_8$ is turned off, and the second interval starts. In the second interval, the secondary current flows through the second short-circuited loop $L_2$, and the secondary current of the transformer decreases reversely. When the secondary current of the transformer is reversely decreased to zero, the second interval ends. The switch $S_5$ is continuously conducted until the switching period $T_2$ ends, and the duty ratio of the switch $S_5$ is equal to 1.

When Gain>2, the switch $S_5$ or the switch $S_8$ is constantly conducted during a switching period. The secondary circuit operates in the alternate half bridge manner, thereby outputting a double voltage. There is a boosting interval (e.g., the period from $t_1$ to $t_2$) in each of the switching periods, thereby boosting the output voltage based on the double voltage. As a result, the voltage gain may be increased rapidly to be greater than 2. When the load is constant, the longer the boosting interval in each of the switching periods is, the larger the obtained voltage gain is. The boosting interval in each of the switching periods is adjusted by controlling the duty ratios of the switches, thereby obtaining the desired voltage gain.

When Gain>2 and the secondary current is continuous, during the first switching period $T_1$, for example, the first interval starts at the time of turning off the switch $S_5$ and ends at the time of turning off the switch $S_8$. That is to say, the first interval is from the time of turning off the switch $S_5$ to the time of turning off the switch $S_8$. During the second switching period $T_2$, for example, the second interval starts at the time of turning off the switch $S_8$ and ends at the time of turning off the switch $S_5$. That is to say, the second interval is from the time of turning off the switch $S_8$ to the time of turning off the switch $S_5$.

When Gain>2 and the secondary current is discontinuous, during the first switching period $T_1$, for example, the first interval starts at the time of turning off the switch $S_5$ and ends at the time when the secondary current is equal to 0. That is to say, the second interval is from the time of turning off the switch $S_8$ to the time when the secondary current is equal to 0. During the second switching period $T_2$, for example, the second interval starts at the time of turning off the switch $S_8$ and ends at the time when the secondary current is equal to 0. That is to say, the second interval is from the time of turning off the switch $S_5$ to the time when the secondary current is equal to 0.

In some embodiments according to the present disclosure, such as those shown in FIGS. 3 to 5, the method for controlling the resonant converter may include the following steps:

acquiring an output voltage, and obtaining a regulated signal according to the output voltage;

during the first switching period (e.g., the switching period $T_1$), adjusting the duty ratio of the first one (e.g., the switch $S_8$) of the first controllable switch and the second controllable switch based on the regulated signal, and setting the duty ratio of the second one (e.g., the switch $S_5$) of the first controllable switch and the second controllable switch to be a fixed value; and during the second switching period (e.g., the switching period $T_2$), setting the duty ratio of the first one (e.g., the switch $S_8$) of the first controllable switch and the second controllable switch to be the fixed value, and adjusting the duty ratio of the second one (e.g., the switch $S_5$) of the first controllable switch and the second controllable switch based on the regulated signal.

Here, the first switching period and the second switching period may be continuous. Adjust the duty ratio of the first one of the first controllable switch and the second controllable switch based on the regulated signal so as to modulate the first one according to the regulated signal. Adjust the duty ratio of the second one of the first controllable switch and the second controllable switch based on the regulated signal so as to modulate the second one according to the regulated signal.

In other words, the present disclosure proposes an alternate half-bridge method for controlling the resonant converter. The duty ratios of two controllable switches are adjusted based on the output voltage, the two controllable switches are arranged diagonally in two secondary half-bridge of the secondary circuit, and a regulated signal of the duty ratio is obtained by controlling the output voltage in a closed-loop manner. The wide-range boosting of the output voltage can be implemented by alternately modulating the duty ratios of the two controllable switches, and two short-circuited loops of the secondary circuit operate alternately, thereby equalizing the switching losses in the secondary circuit and improving the reliability.

The present disclosure is not limited to the above-mentioned embodiments. When there are at least two switching periods, one is the first switching period mentioned above, and the other one is the second switching period mentioned above, which also belongs to various embodiments of the present disclosure.

In the present disclosure, the resonant converter further includes a controller for performing the above controlling method. Here, the controller may be implemented as a digital processing chip, such as DSP and FPGA. The controller may alternatively be artificial circuits.

Figure 6A:
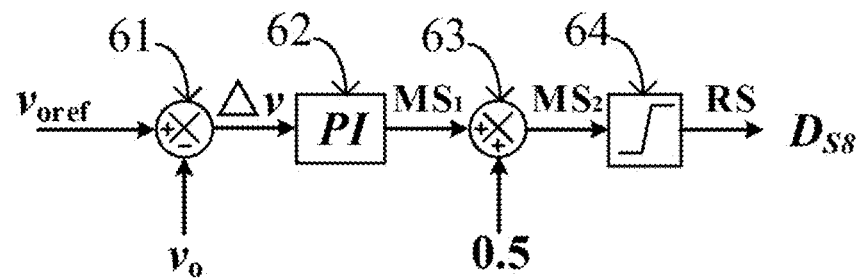
FIG. 6A shows a control block of the duty ratio with 1≤Gain≤2.
Figure 6B:
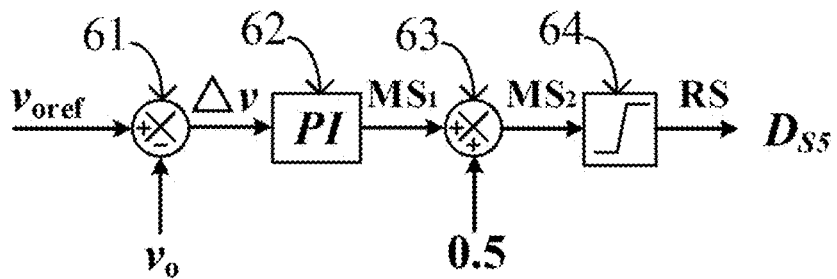
FIG. 6B shows a control block of the duty ratio with Gain>2.

In the present disclosure, boosting ratios may be adjusted in the closed-loop manner. FIGS. 6A and 6B show the control block of the duty ratio. In the figures, the controller includes, for example, a subtractor 61, a regulator 62, an adder 63 and a limiter 64. The subtractor 61 is configured to compare the output voltage $v_o$ with a reference value $v_{oref}$ to obtain an error signal $^\Delta v$. The regulator 62 is configured to regulate the error signal $^\Delta v$ to obtain a first intermediate signal $MS_1$. The adder 63 is configured to superimpose a constant value (e.g., 0.5, but the present disclosure is not limited thereto) on the first intermediate signal $MS_1$ to obtain a second intermediate signal $MS_2$. The limiter 64 is configured to limit the second intermediate signal $MS_2$ to obtain a regulated signal RS. The duty ratios of the switches, such as the switches $S_8$ and $S_5$, are adjusted according to the regulated signal RS. As shown in FIG. 6A, when 1 Gain 2, $D_{S5}=0.5$, and an initial value of $D_{S8}$ is 0.5. The value of $D_{S8}$ is adjusted according to the output voltage $v_o$. During the first switching period, the duty ratio of the switch $S_5$ is 0.5, and the duty ratio of the switch $S_8$ may be adjusted according to the regulated signal RS. The duty ratio of the switch $S_8$ varies in the range of [0.5, 1] to obtain the desired output voltage. During the second switching period, the duty ratio of the switch $S_8$ is 0.5, and the duty ratio of the switch $S_5$ is adjusted according to the regulated signal RS. The duty ratio of the switch $S_5$ varies in the range of [0.5, 1] to obtain the desired output voltage. When the load is constant, during the first switching period, the larger the duty ratio of the switch $S_8$ is, the longer the first interval is, the longer boosting time of the secondary circuit is, and the larger the obtained voltage gain is. Similarly, during the second switching period, the larger the duty ratio of the switch $S_5$ is, the longer the second interval is, the longer boosting time of the secondary circuit is, and the larger the obtained voltage gain is.

As shown in FIG. 6B, when Gain>2, $D_{S8}=1$, the initial value of $D_{S5}$ is 0.5. The $D_{S5}$ is adjusted according to the output voltage $v_o$ in the closed-loop manner to implement the boosting of the output voltage. During the first switching period, the duty ratio of the switch $S_8$ is 1, and the duty ratio of the switch $S_5$ is adjusted according to the regulated signal RS. The duty ratio of the switch $S_5$ varies in the range of (0.5, 1) to obtain the desired output voltage. During the second switching period, the duty ratio of the switch $S_5$ is 1, and the duty ratio of the switch $S_8$ is adjusted according to the regulated signal RS. The duty ratio of the switch $S_8$ varies in the range of (0.5, 1) to obtain the desired output voltage. When the load is constant, during the first switching period, the larger the duty ratio of the switch $S_5$ is, the longer the boosting time in the secondary circuit is, and the larger the obtained voltage gain is. During the second switching period, the larger the duty ratio of the switch $S_8$ is, the longer the boosting time in the secondary circuit is, and the larger the obtained voltage gain is.

Figure 7A:
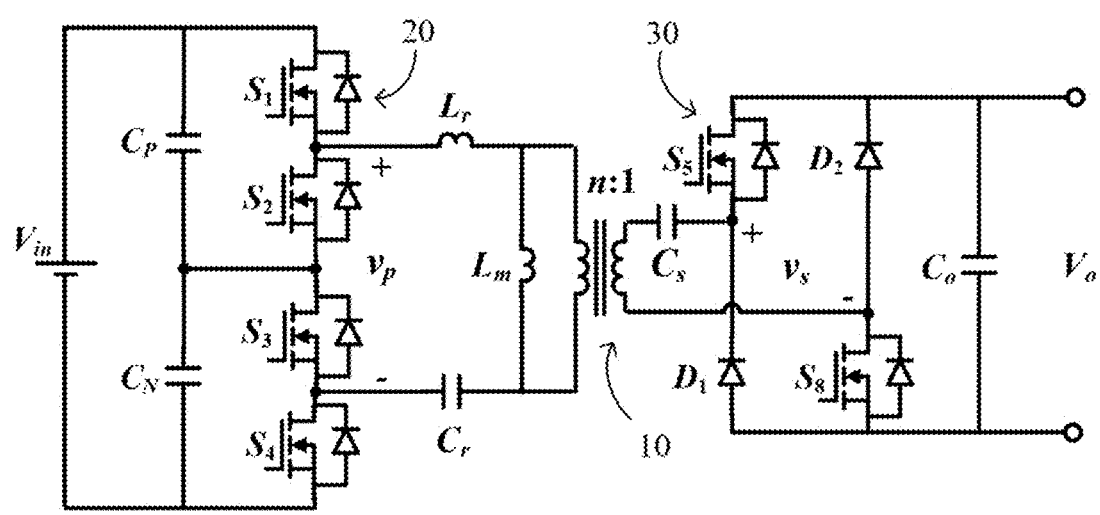
FIG. 7A shows a schematic diagram illustrating another circuit topology of a resonant converter according to the present disclosure.
Figure 7B:
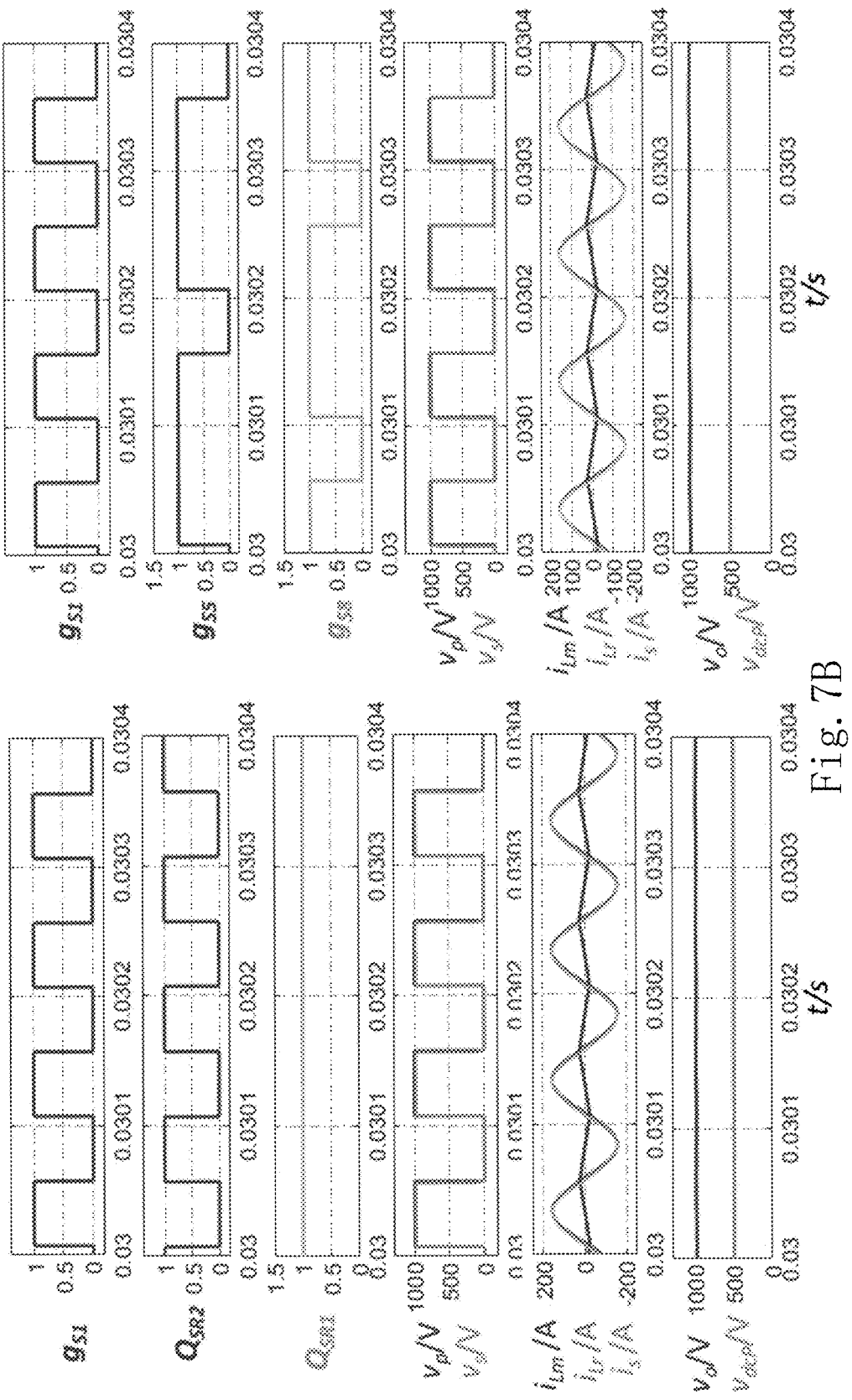
FIG. 7B shows a comparison of simulation results between the present disclosure and the prior art (II)

When Gain=2, a simulated topology of the controlling method according to the present disclosure is shown in FIG. 7A, in which the primary circuit is the SHB circuit, and the transformation ratio n of the transformer is equal to 1. FIG. 7B shows the comparison of simulation results between the present disclosure and the prior art (II). As shown in FIG. 7B, when the double voltage is output, the switch $Q_{SR1}$ in a secondary circuit of the prior art (II) is constantly conducted, while the switch $Q_{SR2}$ is modulated at a 50% duty ratio; and a switching frequency of the switch $Q_{SR2}$ is equal to that of the primary switch. In the case, the turn-off loss occurs mainly at the switch $Q_{SR2}$. In the present disclosure, two secondary half-bridges in which the switches $S_5$ and $S_8$ are located are alternately modulated, and the switching times of the two controlled switches $S_5$ and $S_8$ are same. Accordingly, the switching loss is equalized, and the switching frequency of the switch $S_5$ or $S_8$ is equal to half of that of the primary switch.

Figure 8:
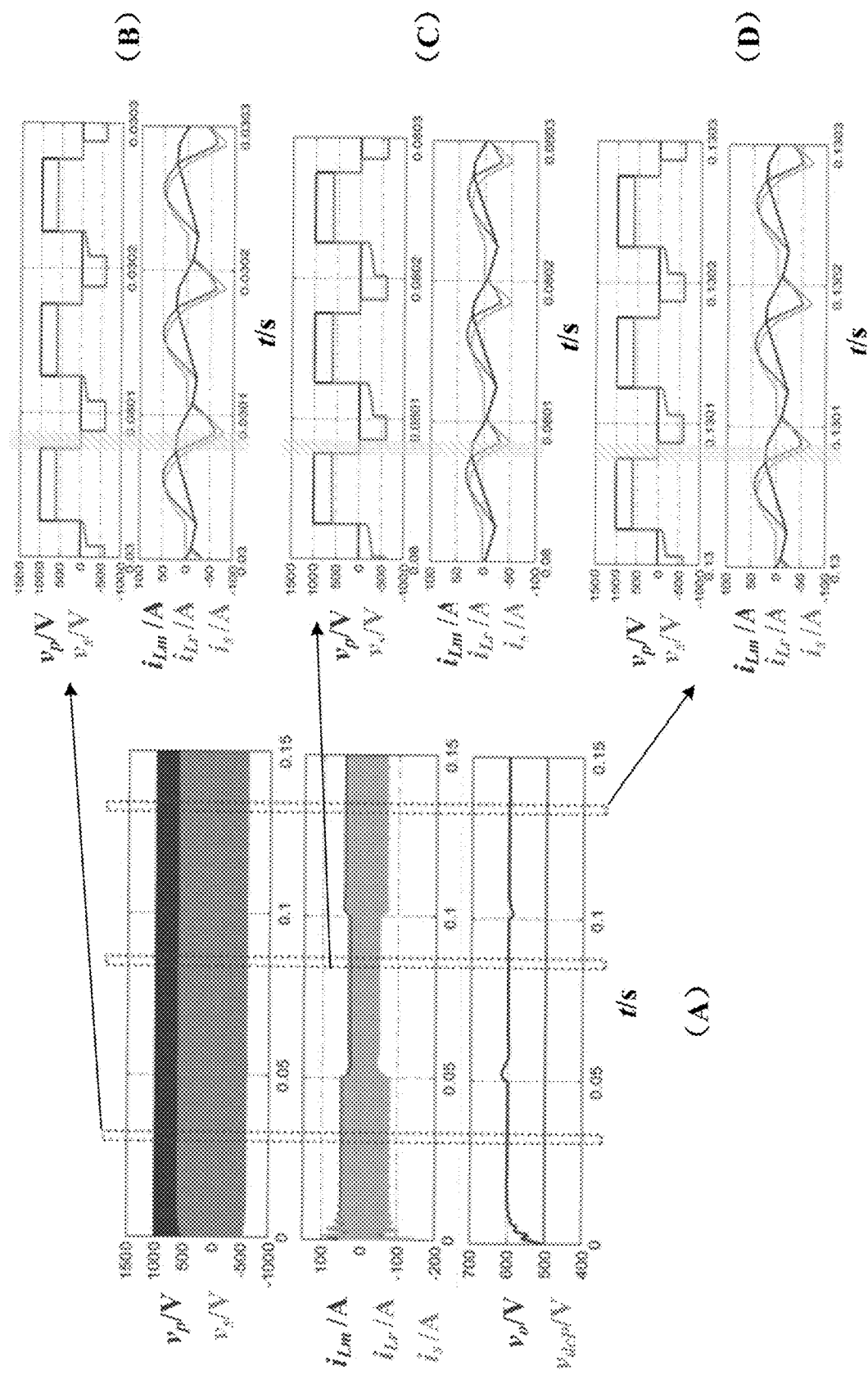
FIG. 8 shows effects of the controlling method according to the present disclosure when increasing loads or decreasing loads.

FIG. 8 shows effects of the controlling method according to the present disclosure when increasing loads or decreasing loads. The reference value V ore f of the output voltage is 600V, the input voltage is 500V, the transformation ratio n of the transformer is equal to 1, and the voltage gain is 1.2. As shown in FIG. 8, when the load increases or decreases suddenly, the output voltage and the waveform of the resonant cavity are kept stable and the envelope line of the resonant cavity varies with the load. That is to say, the operations of the resonant converter are stable by using the controlling method in the present disclosure when the load dynamically changes. Please referring to parts (A) and (B) of FIG. 8, a peak value of the resonant current $i_{Lr}$ is equal to 50 A in the interval from 0 to 0.05 s. Please referring to parts (A) and (C) of FIG. 8, the load is decreased at 0.05 s, then the peak value of the resonant current $i_{Lr}$ is less than 50 A in the interval from 0.05 s to 0.1 s, and the output voltage and the waveform of the resonant cavity are kept stable. The boosting interval (i.e., the short-circuit time of the secondary circuit) in the part (C) of FIG. 8 is shorter than that in the part (B) of FIG. 8. When the load decreases, the duty ratio of the switch is adjusted to be decreased and the boosting interval of the secondary circuit is reduced, thereby keeping the output voltage stable. As shown in parts (A) and (D) of FIG. 8, the load is increased at 0.1 s, then the peak value of the resonant current $i_{Lr}$ is close to 50 A in the interval from 0.1 s and s, and the output voltage and the waveform of the resonant cavity are kept stable. The boosting interval (i.e., the short-circuit time at the secondary circuit) in the part (D) of FIG. 8 is longer than that in the part (C) of FIG. 8. When the load increases, the duty ratio of the switch is adjusted to be increased and the boosting interval of the secondary circuit is increased, thereby keeping the output voltage stable. As shown in FIG. 8, the short-circuit time of the secondary circuit varies with the load, which proves the applicability of the controlling method in the present disclosure to the case in which the load varies.

Figure 9:
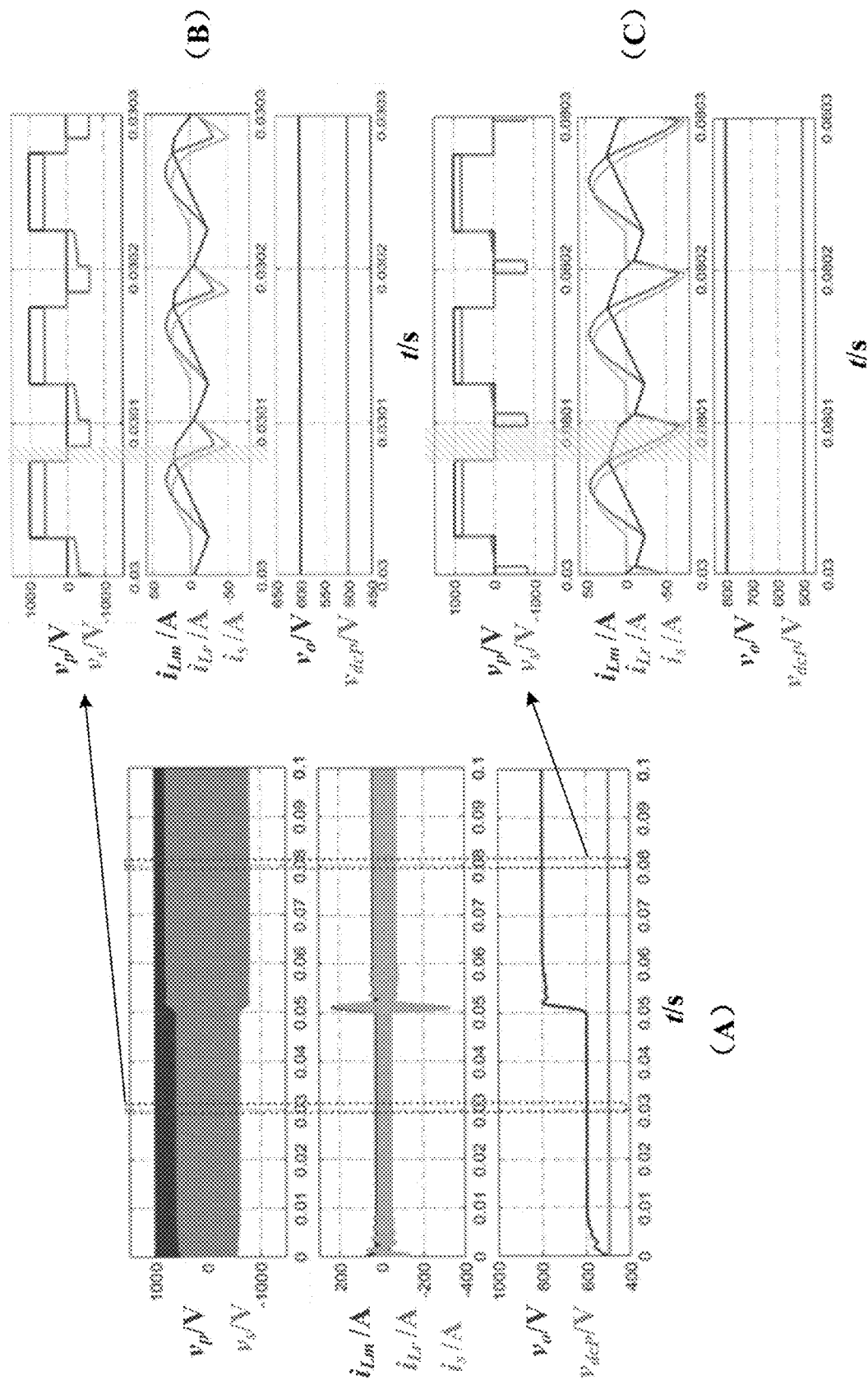
FIG. 9 shows effects of the controlling method according to the present disclosure when a reference value of an output voltage is changed.

FIG. 9 shows effects of the controlling method according to the present disclosure when a reference value of the output voltage is changed. The input voltage is 500V and the transformation ratio n of the transformer is equal to 1. As shown in parts (A) and (B) of FIG. 9, during the interval from 0 to 0.05 s, the reference value of the output voltage is 600V, the output voltage following the reference value is equal to 600V, the waveform of the resonant cavity is kept stable, and the voltage gain is equal to 1.2. As shown in parts (A) and (C) of FIG. 9, the reference value of the output voltage increases to 800 V at 0.05 s, then the output voltage following the reference value is equal to 800V in the interval from 0.05 s to the waveform of the resonant cavity is kept stable, and the voltage gain is increased to 1.6. The boosting interval (i.e., the short-circuit time of the secondary circuit) in the part (C) of FIG. 9 is longer than that in the part (B) of FIG. 9. When the reference value of the output voltage increases, the voltage gain also increases. Accordingly, the duty ratio of the switch is adjusted to be increased, and the boosting interval of the secondary circuit is increased, thereby keeping the output voltage to follow the reference value. As shown in FIG. 9, when the voltage gain and the output voltage increase, the short-circuit time of the secondary circuit gets longer. Accordingly, the controlling method according to the present disclosure may be adapted to the case in which the given value of the output voltage is with a step change. The output voltage can track the change of $V_{oref}$ in time by using the controlling method of the present disclosure.

It is understood that the embodiments of the present disclosure are not limited to the control of the voltage boosting in the resonant converter in which the primary circuit has the SHB topology. The alternate half-bridge controlling method according to the present disclosure may be applied in SST, and the SST may be used in many applications such as fast charging stations, photovoltaic power generation stations, data centers, energy storages and microgrid. The present disclosure is also not limited to the examples.

Figure 10:
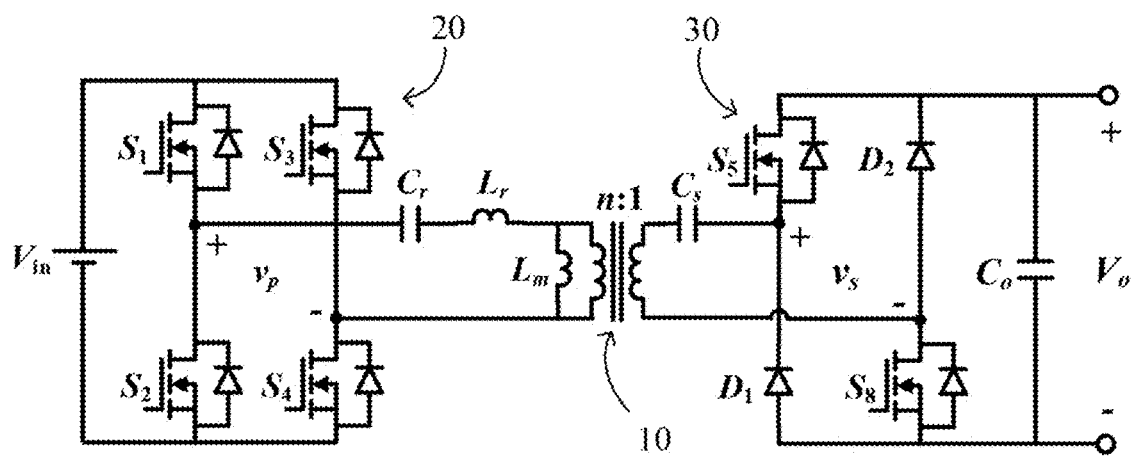
FIG. 10 shows a schematic diagram illustrating another circuit topology of a resonant converter according to the present disclosure.
Figure 11:
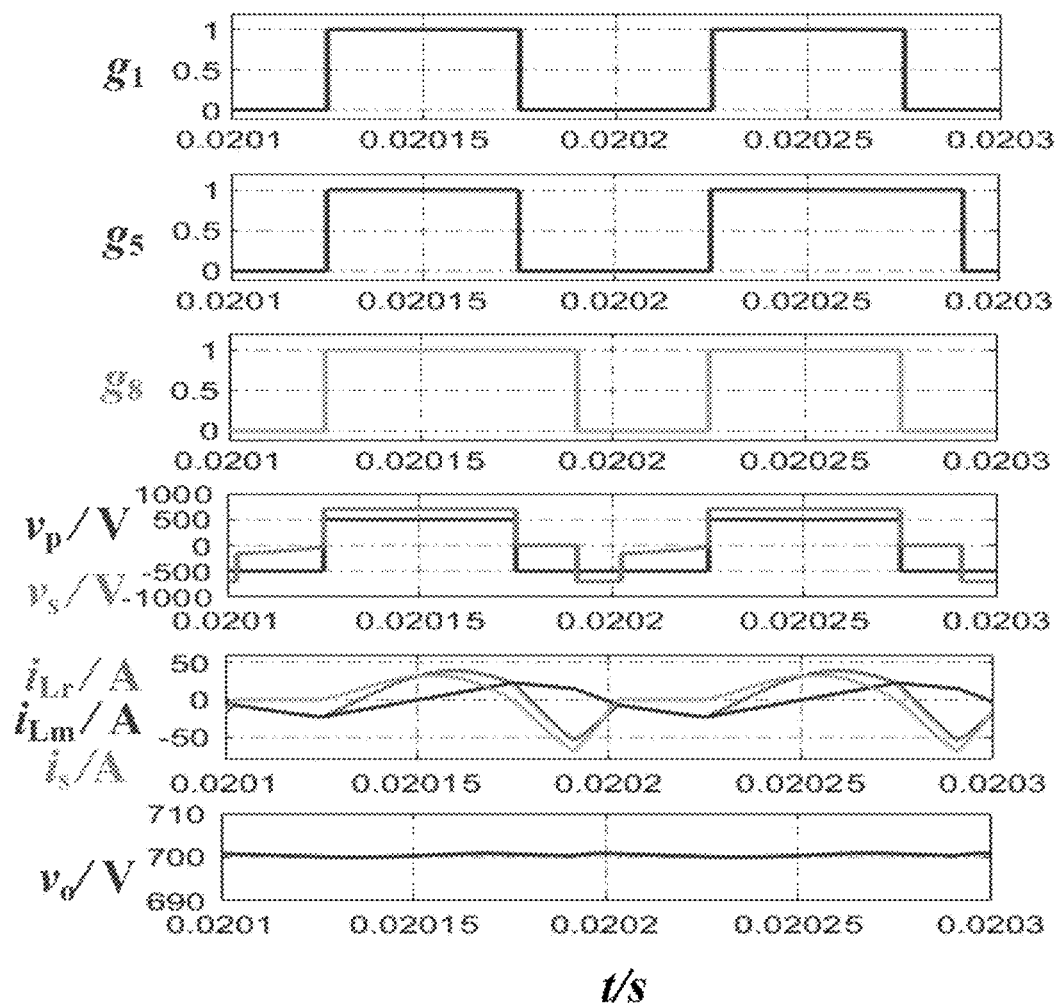
FIG. 11 shows effects of the controlling method according to the present disclosure when the primary circuit has the full-bridge topology.

Referring to FIG. 10, FIG. 10 shows a resonant converter including a primary circuit 20 having the full-bridge topology. FIG. 11 shows effects of the control method. When the primary circuit 20 has the full-bridge topology, a voltage of the primary leg may be switched between +$V_{in}$ and −$V_{in}$, and the controlling method according to the present disclosure is also applicable.

Figure 12:
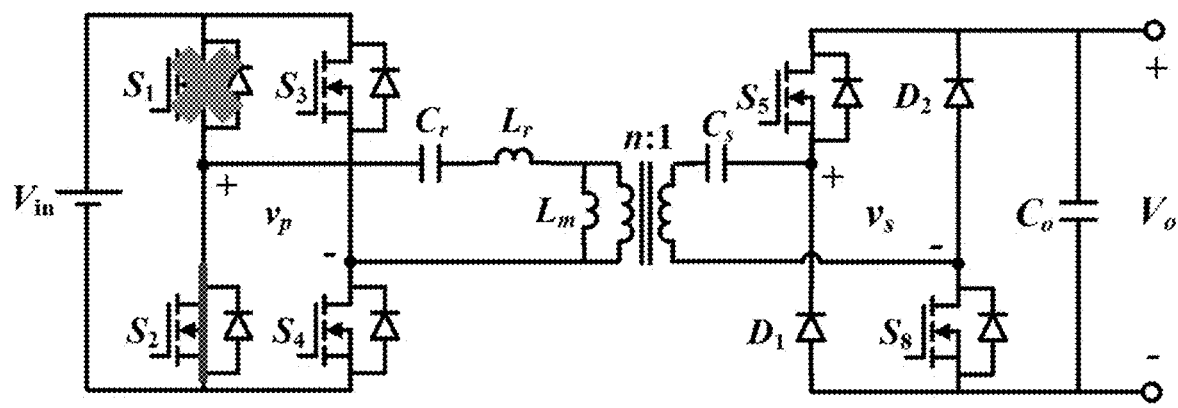
FIG. 12 is a schematic diagram of the resonant converter in which an open-circuited fault occurs in a switch of the primary circuit.

When an open-circuited fault occurs in one switch of the primary circuit, the other switch located in the same bridge with the fault switch is constantly conducted and the primary circuit is changed to operate in a half-bridge mode. As shown in FIG. 12, assuming that the switch $S_1$ of the primary circuit could not receive the driving signal due to a fault, the other switch $S_2$ in the same bridge may be constantly conducted, and the switch $S_3$ and the switch $S_4$ may be conducted complementarily at a 50% duty ratio. The secondary circuit may be controlled with the controlling method according to the present disclosure. The above-mentioned process may also be applied when the open-circuited fault occurs in other switch of the primary circuit.

Figure 13:
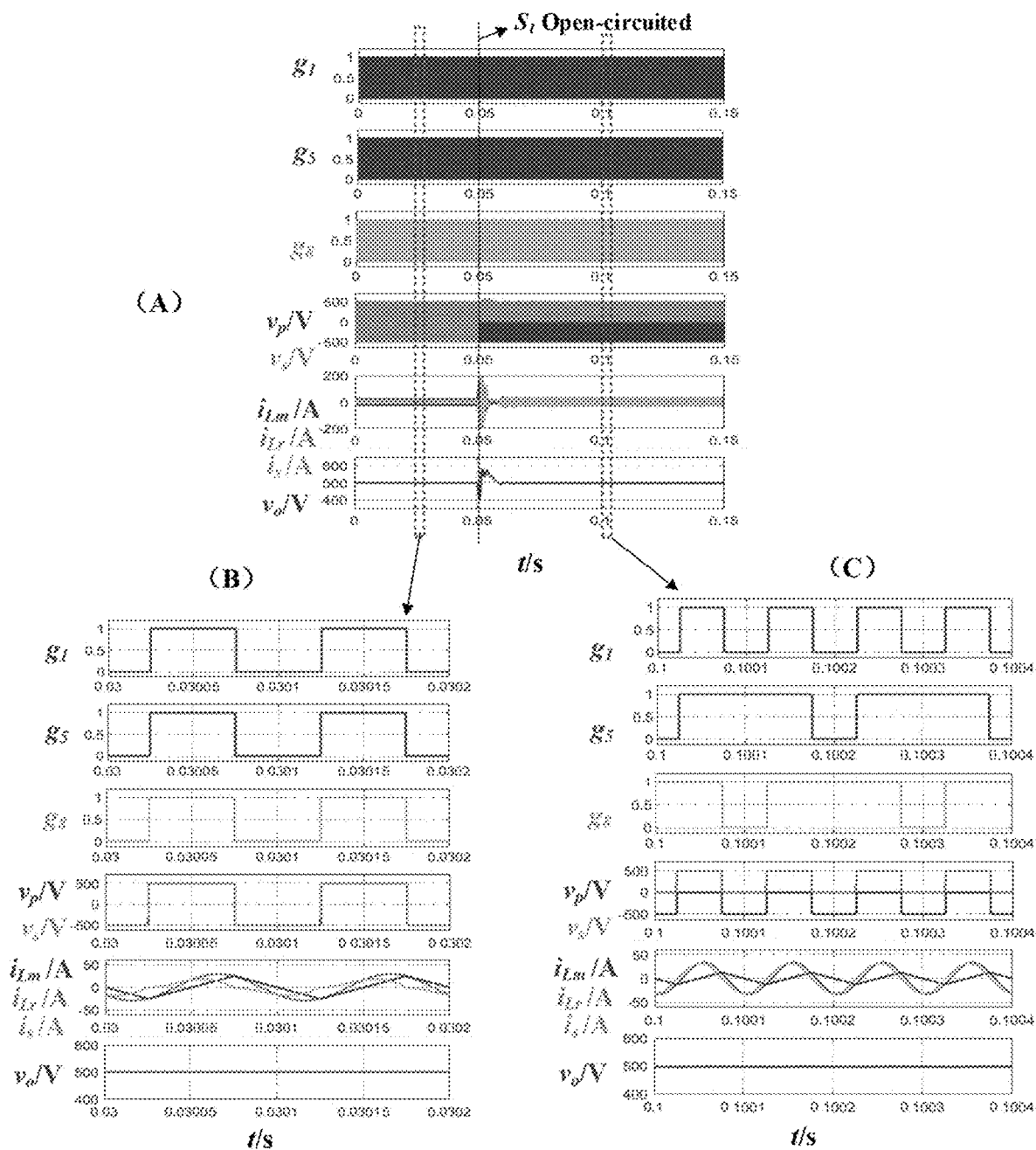
FIG. 13 shows control effects when an open-circuited fault occurs in the switch of the primary circuit.

FIG. 13 shows control effects when the open-circuited fault occurs in the switch S1 of the primary circuit. The output voltage is 500V, the input voltage is 500V, and the transformation ratio n of the transformer is equal to 1. As shown in parts (A) and (B) of FIG. 13, during the interval from 0 to 0.05 s, no fault occurs in the switch of the primary circuit. The primary leg voltage is switched between +$V_{in}$ and −$V_{in}$. The duty ratios of the switches $S_5$ and $S_8$ are equal to 0.5. The output voltage is equal to 500V. The voltage gain is equal to 1. The resonant cavity is kept stable. As shown in parts (A) and (C) of FIG. 13, it is simulated that a fault occurs in the switch $S_1$ at 0.05 s. Then, the switch $S_2$ is constantly conducted, the primary leg voltage is changed to switch between +$V_{in}$ and 0. Additionally, the primary leg voltage becomes half of that before the fault, as if the input voltage becomes half of that before the fault. In order to keep the output voltage unchanged, the secondary circuit is switched to control the switches $S_5$ and $S_8$ to operate in the alternate half-bridge operation mode, thereby achieving the double voltage output and maintaining the output voltage stable. And the fault-tolerant operation is allowed in the resonant converter. As shown in the part (C) of FIG. 13, the output voltage is kept stable, the voltage gain is equal to 2, and the resonant cavity is also kept stable. The fault-tolerant method may be implemented by the controller of the resonant converter.

As shown in FIG. 14, the present disclosure also provides a method 400 for modulating the resonant converter 100 shown in FIG. 1, which includes the following steps.

In step S301, the first controllable switch and the second controllable switch are modulated respectively, to form a short-circuited loop in the secondary circuit, such that a voltage between a neutral-point of the first secondary half-bridge and a neutral point of the second secondary half-bridge is to be zero.

According to the present disclosure, the duty ratios of two controllable switches arranged diagonally in the secondary circuit are modulated alternately to implement the wide-range boosting of the output voltage. In addition, the two short-circuited loops of the secondary circuit operate alternately, thereby equalizing the switching loss in the two secondary-side bridges of the secondary circuit and improving the reliability of the system.

The present disclosure is applicable to the resonant converters including primary circuit having the full-bridge topology, the half-bridge series topology, or other topologies. Besides, the resonant converters may implement the fault-tolerant operation when the open-circuited fault occurs in any one of the switches in the primary circuit.

The exemplary embodiments of the present disclosure are as specifically shown and described above. It should be understood that the present disclosure is not limited to the disclosed embodiments, rather, it is intended to cover various modifications and equivalent arrangements within the spirit and scope of protection of the appended claims.

What is claimed is:

1. A method for controlling a resonant converter, wherein the resonant converter comprises: a transformer having a primary winding and a secondary winding; a primary circuit electrically connected to the primary winding and receiving an input voltage; and a secondary circuit electrically connected to the secondary winding and outputting an output voltage, wherein the secondary circuit comprises a first secondary half-bridge and a second secondary half-bridge connected in parallel, the first secondary half-bridge comprises a first controllable switch, the second secondary half-bridge comprises a second controllable switch, and the first controllable switch and the second controllable switch are arranged diagonally; and the method comprises:
controlling a duty ratio of a first one of the first controllable switch and the second controllable switch in a first switching period to form a first short-circuited loop during a first interval; and
controlling a duty ratio of a second one of the first controllable switch and the second controllable switch in a second switching period to form a second short-circuited loop during a second interval.

2. The method for controlling the resonant converter according to claim 1, wherein
the first switching period and the second switching period are adjacent switching periods; or
the first switching period and the second switching period are spaced apart from each other with an integer number of switching periods.

3. The method for controlling the resonant converter according to claim 1, further comprising:
acquiring the output voltage, and obtaining a regulated signal according to the output voltage;
during the first switching period, adjusting the duty ratio of the first one of the first controllable switch and the second controllable switch based on the regulated signal, and setting the duty ratio of the second one of the first controllable switch and the second controllable switch to be a fixed value; and
during the second switching period, setting the duty ratio of the first one of the first controllable switch and the second controllable switch to be the fixed value, and adjusting the duty ratio of the second one of the first controllable switch and the second controllable switch based on the regulated signal.

4. The method for controlling the resonant converter according to claim 1, wherein when 1≤Gain≤2 and Gain indicates a voltage gain, the method further comprises:
during the first switching period, controlling the duty ratio of the first one of the first controllable switch and the second controllable switch to be equal to or greater than 0.5 and less than or equal to 1 based on the output voltage, and modulating the duty ratio of the second one of the first controllable switch and the second controllable switch to be equal to 0.5; and
during the second switching period, modulating the duty ratio of the first one of the first controllable switch and the second controllable switch to be equal to 0.5, and controlling the duty ratio of the second one of the first controllable switch and the second controllable switch to be equal to or greater than 0.5 and less than or equal to 1 based on the output voltage.

5. The method for controlling the resonant converter according to claim 1, wherein when 1≤Gain≤2 and Gain indicates a voltage gain,
during the first switching period, the first interval starts at a time of turning off the second one of the first controllable switch and the second controllable switch and ends at a time of turning off the first one of the first controllable switch and the second controllable switch; and
during the second switching period, the second interval starts at a time of turn off the first one of the first controllable switch and the second controllable switch, and ends at a time of turning off the second one of the first controllable switch and the second controllable switch.

6. The method for controlling the resonant converter according to claim 1, wherein when 1≤Gain≤2 and Gain indicates a voltage gain,
the first short-circuited loop corresponds to a loop formed by the secondary winding, the first one of the first controllable switch and the second controllable switch, and a switch located in the same bridge with the second one of the first controllable switch and the second controllable switch; and
the second short-circuited loop corresponds to a loop formed by the secondary winding, the second one of the first controllable switch and the second controllable switch, and a switch located in the same bridge with the first one of the first controllable switch and the second controllable switch.

7. The method for controlling the resonant converter according to claim 1, wherein when Gain>2 and Gain indicates a voltage gain, the method further comprises:

during the first switching period, controlling the duty ratio of the first one of the first controllable switch and the second controllable switch to be greater than 0.5 and less than 1 based on the output voltage, and modulating the duty ratio of the second one of the first controllable switch and the second controllable switch to be equal to 1; and during the second switching period, modulating the duty ratio of the first one of the first controllable switch and the second controllable switch to be equal to 1, and controlling the duty ratio of the second one of the first controllable switch and the second controllable switch to be greater than 0.5 and less than 1 based on the output voltage.

8. The method for controlling the resonant converter according to claim 1 wherein when Gain>2 and a secondary current is continuous, wherein Gain indicates a voltage gain, during the first switching period, the first interval starts at a time of turning off the first one of the first controllable switch and the second controllable switch and ends at a time of turning off the second one of the first controllable switch and the second controllable switch; and during the second switching period, the second interval starts at a time of turning off the second one of the first controllable switch and the second controllable switch, and ends at a time of turning off the first one of the first controllable switch and the second controllable switch.

9. The method for controlling the resonant converter according to claim 1, wherein when Gain>2 and the secondary current is discontinuous, wherein Gain indicates the voltage gain, during the first switching period, the first interval starts at a time of turning off the first one of the first controllable switch and the second controllable switch, and ends at a time when a secondary current is decreased to zero; and during the second switching period, the second interval starts at a time of turning off the second one of the first controllable switch and the second controllable switch, and ends at a time when the secondary current is decreased to zero.

10. The method for controlling the resonant converter according to claim 1, wherein when Gain>2 and Gain indicates a voltage gain, the first short-circuited loop corresponds to a loop formed by the secondary winding, the second one of the first controllable switch and the second controllable switch, and a switch located in the same bridge with the first one of the first controllable switch and the second controllable switch; and the second short-circuited loop corresponds to a loop formed by the secondary winding, the first one of the first controllable switch and the second controllable switch, and a switch located in the same bridge with the second one of the first controllable switch and the second controllable switch.

11. The method for controlling the resonant converter according to claim 3, further comprising:

comparing the output voltage with a reference value to obtain an error signal;

regulating the error signal to obtain a first intermediate signal;

superimposing a constant value on the first intermediate signal to obtain a second intermediate signal; and limiting the second intermediate signal to obtain the regulated signal.

12. The method for controlling the resonant converter according to claim 1, wherein the method further comprises:

when an open-circuited fault occurs in a switch of a first bridge in the primary circuit, constantly conducting the other switch of the first bridge, and complementarily conducting two switches of a second bridge.

13. A resonant converter comprising:

a transformer having a primary winding and a secondary winding;

a primary circuit electrically connected to the primary winding and receiving an input voltage;

a secondary circuit electrically connected to the secondary winding and outputting an output voltage, wherein the secondary circuit comprises a first secondary half-bridge and a second secondary half-bridge connected in parallel, the first secondary half-bridge comprises a first controllable switch, a second secondary half-bridge comprises a second controllable switch, and the first controllable switch and the second controllable switch are arranged diagonally; and a controller configured to:

control a duty ratio of a first one of the first controllable switch and the second controllable switch in a first switching period to form a first short-circuited loop during a first interval during; and control the duty ratio of a second one of the first controllable switch and the second controllable switch in a second switching period to form a second short-circuited loop during a second interval.

14. The resonant converter according to claim 13, wherein the controller is configured to:

acquire the output voltage, and obtain a regulated signal according to the output voltage;

during the first switching period, adjust the duty ratio of the first one of the first controllable switch and the second controllable switch based on the regulated signal, and set the duty ratio of the second one of the first controllable switch and the second controllable switch to be a fixed value; and during the second switching period, set the duty ratio of the first one of the first controllable switch and the second controllable switch to be the fixed value, and adjust the duty ratio of the second one of the first controllable switch and the second controllable switch based on the regulated signal.

15. The resonant converter according to claim 13, wherein the controller comprises:

a subtractor configured to compare the output voltage with a reference value to obtain an error signal;

a regulator configured to regulate the error signal to obtain a first intermediate signal;

an adder configured to superimpose a constant value on the first intermediate signal to obtain a second intermediate signal; and a limiter configured to limit the second intermediate signal to obtain the regulated signal.

16. The resonant converter according to claim 13, wherein the controller is further configured to:

when an open-circuited fault occurs in a switch of a first bridge in the primary circuit, constantly conduct the other switch of the first bridge, and complementarily conduct two switches of a second bridge.

17. The resonant converter according to claim 13, wherein the secondary circuit further comprises:

a blocking capacitor electrically connected in series with the secondary winding and then electrically connected to a neutral point of the first secondary half-bridge and a neutral point of the second secondary half-bridge.

18. The resonant converter according to claim 13, wherein the first controllable switch is an upper switch of the first secondary half-bridge and the second controllable switch is a lower switch of the second secondary half-bridge; or the first controllable switch is a lower switch of the first secondary half-bridge and the second controllable switch is an upper switch of the second secondary half-bridge.

19. The resonant converter according to claim 13, wherein the first secondary half-bridge further comprises a diode electrically connected in series with the first controllable switch; and the second secondary half-bridge further comprises a diode electrically connected in series with the second controllable switch.

20. A method for modulating a resonant converter, wherein the resonant converter comprises a transformer having a primary winding and a secondary winding; a primary circuit electrically connected to the primary winding and receiving an input voltage; and a secondary circuit electrically connected to the secondary winding and outputting an output voltage, wherein the secondary circuit comprises a first secondary half-bridge and a second secondary half-bridge connected in parallel, the first secondary half-bridge comprises a first controllable switch, the second secondary half-bridge comprises a second controllable switch, and the first controllable switch and the second controllable switch are arranged diagonally; and the method comprises:

modulating the first controllable switch and the second controllable switch respectively to form a short-circuited loop in the secondary circuit, such that a voltage between a neutral point of the first secondary half-bridge and a neutral point of the second secondary half-bridge is to be zero.

* * * * *